(12) United States Patent
Zhang et al.

(10) Patent No.: US 10,408,599 B2
(45) Date of Patent: Sep. 10, 2019

(54) SENSING CIRCUIT, PROCESSING METHOD OF SENSING CIRCUIT AND CURVED SURFACE PROFILE MEASURING METHOD THEREOF

(71) Applicant: JIAOTU CO., LTD., Suzhou (CN)

(72) Inventors: Zheng Zhang, Suzhou (CN); Fuqiu Ye, Suzhou (CN); Qin Cheng, Suzhou (CN); Rengui Bi, Suzhou (CN)

(73) Assignee: JIAOTU CO., LTD., Suzhou, Jiangsu (CN)

( * ) Notice: Subject to any disclaimer, the term of this patent is extended or adjusted under 35 U.S.C. 154(b) by 214 days.

(21) Appl. No.: 15/458,076

(22) Filed: Mar. 14, 2017

(65) Prior Publication Data

US 2017/0268863 A1 Sep. 21, 2017

(30) Foreign Application Priority Data

Mar. 18, 2016 (CN) .......................... 2016 1 0154361
Mar. 18, 2016 (CN) .......................... 2016 1 0154362
Mar. 18, 2016 (CN) .......................... 2016 1 0154568
Mar. 18, 2016 (CN) .......................... 2016 1 0154611

(51) Int. Cl.
*H04W 24/10* (2009.01)
*G01B 7/28* (2006.01)
*G01B 7/16* (2006.01)
*G01B 7/287* (2006.01)

(52) U.S. Cl.
CPC ............... *G01B 7/282* (2013.01); *G01B 7/22* (2013.01); *G01B 7/28* (2013.01); *G01B 7/287* (2013.01)

(58) Field of Classification Search
CPC ............ G01R 27/2605; G01R 31/2875; G01R 31/028; H04W 76/14; H04W 24/08; H04W 24/10
USPC ...... 324/519, 671, 750.17, 754.28, 548, 658, 324/661, 686, 76.66, 609, 178, 750, 699, 324/412, 750.03; 455/67.11, 1, 41.1, 275, 455/126
See application file for complete search history.

(56) References Cited

U.S. PATENT DOCUMENTS

| 5,208,528 | A | * | 5/1993 | Quintard | G01R 31/309 |
| | | | | | 250/330 |
| 5,610,528 | A | * | 3/1997 | Neely | A61B 5/1071 |
| | | | | | 324/660 |
| 8,476,912 | B2 | * | 7/2013 | Dorrough | G01R 27/26 |
| | | | | | 324/671 |
| 2005/0116729 | A1 | * | 6/2005 | Koester | G01L 27/005 |
| | | | | | 324/750.03 |

(Continued)

*Primary Examiner* — Jermele M Hollington
*Assistant Examiner* — Taqi R Nasir
(74) *Attorney, Agent, or Firm* — Ming Jiang; MM IP Services LLC

(57) ABSTRACT

The present invention discloses a sensing circuit, a processing method of the sensing circuit and a curved surface profile measuring method. Conductors of the sensing circuit are arranged in flexible protection bodies in a braiding manner, and the conductors and the flexible protection bodies are at a compressed state. Therefore, the sensing circuit of the present invention has better flexibility and tensile property, can be attached to a surface of equipment, can be used for sensing multiple situations of the equipment, such as slight touch and collision of a large displacement, and can also be applied to precise measurement of a size of a curved surface profile.

5 Claims, 13 Drawing Sheets

(56) References Cited

U.S. PATENT DOCUMENTS

| | | | | |
|---|---|---|---|---|
| 2009/0093987 | A1* | 4/2009 | Ni | G01R 27/04 |
| | | | | 702/107 |
| 2010/0097079 | A1* | 4/2010 | Sheikman | G01B 7/14 |
| | | | | 324/686 |
| 2010/0148791 | A1* | 6/2010 | Oldenburg | G01R 31/008 |
| | | | | 324/523 |
| 2010/0292945 | A1* | 11/2010 | Reynolds | G06F 3/044 |
| | | | | 702/65 |
| 2011/0187394 | A1* | 8/2011 | Rodel | E02D 31/02 |
| | | | | 324/699 |
| 2013/0194442 | A1* | 8/2013 | Yazawa | H04N 5/23264 |
| | | | | 348/208.7 |
| 2013/0257456 | A1* | 10/2013 | Liu | B81B 7/008 |
| | | | | 324/658 |
| 2014/0300374 | A1* | 10/2014 | McKenzie | G01R 15/16 |
| | | | | 324/658 |
| 2015/0377934 | A1* | 12/2015 | Choe | G01R 19/2513 |
| | | | | 361/631 |

* cited by examiner

Laying a substrate to be flat, wherein a conducting material penetrates through the substrate and is arranged by penetrating through two surfaces of the substrate so as to form a sensing circuit on two surfaces of the substrate After the sensing circuit is laid, performing insulation and flatness treatment to two surfaces of the substrate, namely performing insulation treatment on the sensing circuit Guiding the electric field circuit out from the edge of the circuit substrate via a lead Adhering an insulation material to the sensing circuit

FIG. 14

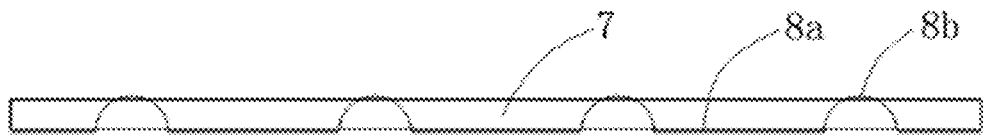

FIG. 14A

FIG. 14B

Distributing a conducting material and the substrates at intervals according to a certain proportion, and mixing the conducting material and the substrates together to form the sensing circuit according to the arrangement of the electric field circuit and by adopting a braiding manner

↓

Guiding the electric field circuit out from the edge of the sensing circuit via a lead after the sensing circuit is braided

↓

Adhering an insulation material to the sensing circuit

FIG. 15

Laying the substrate to be flat, and spraying conducting particles to a corresponding position, where the electric field circuit is arranged, on the surface of the substrate to form the sensing circuit

↓

Guiding the electric field circuit out from the edge of the sensing circuit via a lead after the sensing circuit is sprayed

↓

Adhering an insulation material to the sensing circuit

FIG. 16

Attaching the matrix circuit to a curved surface to be measured, and restoring position data of each of electric field channels by sensing a distance value between every two adjacent electric field channels on the sensing circuit Changing a driving position of the sensing circuit at least once in a direction perpendicular to a surface of the curved surface to be measured, and acquiring position data of a plurality of groups of electric field channels Judging a position state of each electric field channel according to the position data of the plurality of groups of electric field channels, and restoring a shape of the curved surface to be measured

FIG. 17

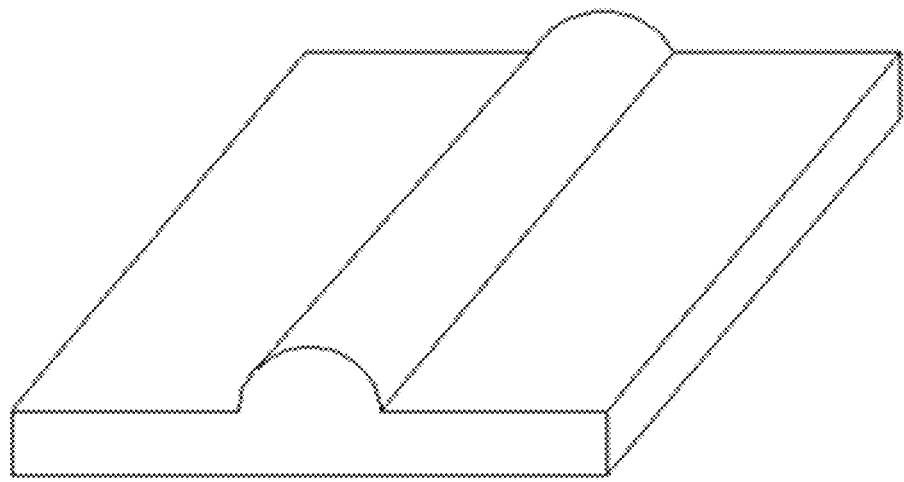

FIG. 18

SENSING CIRCUIT, PROCESSING METHOD OF SENSING CIRCUIT AND CURVED SURFACE PROFILE MEASURING METHOD THEREOF

RELATED APPLICATIONS

The present application claims priority under 35 U.S.C. § 119 to Chinese Patent Applications: 201610154611.0, 201610154568.8, 201610154362.5, and 201610154361.0, all filed on Mar. 18, 2016, the disclosures of which are incorporated herein in their entireties by reference.

FIELD

The present invention relates to the field of sensing circuit, in particular to a sensing circuit, a processing method of the sensing circuit and a curved surface profile measuring method.

BACKGROUND

With the constraint of materials, an existing capacitive screen is unable to perform induction in some special occasions. For example, with respect to a smart wristwatch which changes to a straight strip state from a bent state, the anti-bending ability of a conducting material of the wristband is finite, thus leading that the wristband is not durable. The existing capacitive screen is composed of a deformable material per se, but the force of deformation and the displacement caused by deformation cannot be detected; and the material is likely to be excessively damaged due to deformation, and is thus short in life.

In addition, a processing technology of the existing sensing circuit is complicated in procedure owing to the adoption of manners, such as sputtering and coating, and relatively high in processing requirement and processing cost; and generally, the processed sensing circuit is not flexibly tensile, thereby having poorer tensile property and thus limiting an application scope thereof to a certain degree.

In addition, the measurement of the size, shape, and the like of a curved surface are accomplished mainly depending on a three-coordinates measuring machine at present. It is well-known that the existing three-coordinates measuring machine is more complicated in structure and higher in production cost, and because a calculation process thereof is realized mainly depending on software tools, there is also a great space for improvement in measuring speed and efficiency. Therefore, it is necessary to research a novel curved surface profile measuring method, for a purpose of solving the problems, such as complicated structure, high cost and low measuring speed existing in the prior art.

SUMMARY

Accordingly, An objective of the present invention is to overcome the defects of the prior art and provide a sensing circuit, a processing method of the sensing circuit and a curved surface profile measuring method.

In order to realize said objective, the present invention proposes the following technical solution: a sensing circuit comprises a matrix circuit and circuit substrates, wherein the matrix circuit comprises a plurality of X electrodes and Y electrodes that are distributed crosswise; each of the X electrodes and Y electrodes is composed of a plurality of flexible protection bodies and at least one conductor; the conductors are uniformly distributed in the flexible protection bodies in a braiding manner, and each of the X electrodes and Y electrodes is at a compressed state; the circuit substrates are used for attaching the matrix circuit to a surface of related equipment.

The present invention further discloses another technical solution: a processing method of a sensing circuit comprises the following steps:

uniformly distributing conductors and circuit substrates at intervals according to certain proportion and braiding according to the arrangement of an electric field circuit to form the sensing circuit; or conductors penetrate through the circuit substrate and are arranged by penetrating through two surfaces of the substrate so as to form a sensing circuit on two surfaces of the substrate;

Performing insulation treatment to the sensing circuit;

guiding the electric field circuit out from the edges of the circuit substrates via a lead.

The present invention further discloses yet another technical solution: a curved surface profile measuring method comprises the following steps:

attaching the sensing circuit to a curved surface to be measured, and restoring position data of each of electric field channels by detecting a distance value between every two adjacent electric field channels on the sensing circuit;

acquiring position data of a plurality of groups of electric field channels by changing a driving position of the sensing circuit at least once in a direction perpendicular to a surface of the curved surface to be measured; and judging a position state of each electric field channel according to the position data of the plurality of groups of electric field channels, and restoring a shape of the curved surface to be measured.

The present invention has the following beneficial effects:

1. According to the present invention, the conducting material and the substrates are braided in a mixed manner with a flexible braided fabric as a substrate by adopting a blending manner, the formed matrix circuit can be bent at any angle, has strong tensile property and anti-bending performance, can be attached to surfaces of regular and irregular equipment, and can be configured to perform induction in a plurality of situations, such as slight touch and collision of a large displacement to equipment, or damage to be matrix circuit, and therefore can be widely applied to a plurality fields, such as robots, cars and air phones, and the processing technology is simple and not complicated.

2. The service conditions of a vehicle can be monitored in real time on the basis of the sensing circuit; and when a collision happens, related information can be informed to an owner in time and meanwhile corresponding measures are made for prevention, and therefore the use safety of the vehicle is improved.

3. Special coding signals, such as a key signal can be directly transmitted to the vehicle by contact, and thus cannot be read and interfered easily, and therefore the transmission safety thereof is improved.

4. A lead at the edges of the substrates employs a conducting zipper as an in-out way of the electric field sensing circuit, thereby being convenient and rapid.

5. The position data of electric field channels on the circuit are acquired by an electric field induction manner on the basis of the sensing circuit, and enough data is acquired by changing a driving position of the sensing circuit on a curved surface, and therefore a real profile appearance of the curved surface can be obtained more precisely.

6. Compared with the traditional curved surface measuring method, the curved surface measuring method disclosed by the present invention has the advantages of high measuring speed, high measuring precision, low production cost and the like.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 14 is a flowchart of a processing method of a sensing circuit of embodiment 1 of the present invention;

FIG. 14a is a structural schematic drawing of a sensing circuit of embodiment 1 of the present invention;

FIG. 14b is another structural schematic drawing of the sensing circuit of embodiment 1 of the present invention;

FIG. 15 is a flowchart of a processing method of a sensing circuit of embodiment 2 of the present invention;

FIG. 16 is a flowchart of a processing method of a sensing circuit of embodiment 3 of the present invention;

FIG. 17 is a flowchart of a curved surface profile measuring method of the present invention;

FIG. 18 is a structural schematic drawing of an arched object of an embodiment of the present invention;

Figure 1:
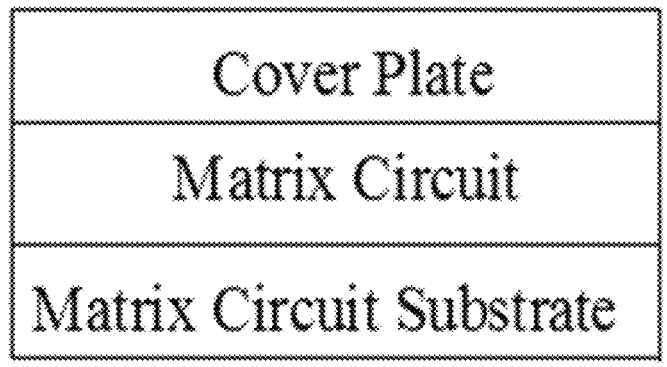
FIG. 1 is a structural schematic drawing of an existing touch screen.

Reference numerals are as follows:

1. Conductors in an X axis direction, 2. Conductors in a Y axis direction, 3. Flexible protection bodies, 4. Signal scanning end, 5. Driving circuit, 6. Electric field signal, 7. Substrate, 8. Conducting material, 8a. Straight portion, and 8b. Raised portion.

DETAILED DESCRIPTION

The technical solutions of the embodiments of the present invention will be described clearly and completely as below in conjunction with the drawings of the present invention.

Figure 2:
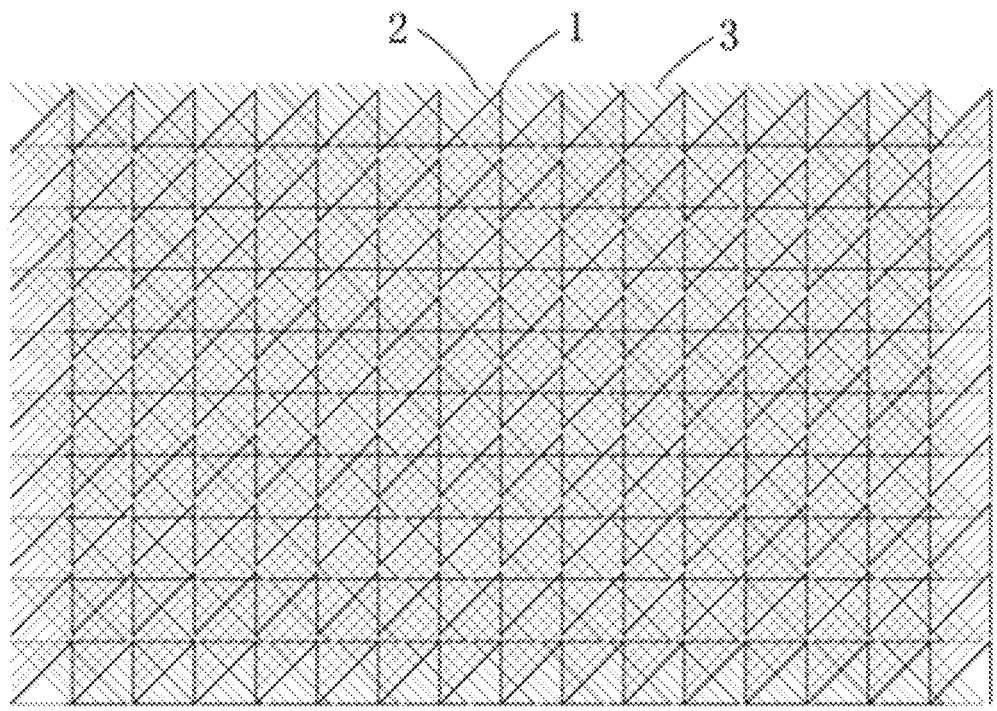
FIG. 2 is a structural schematic drawing of a matrix circuit of the present invention.
Figure 3:
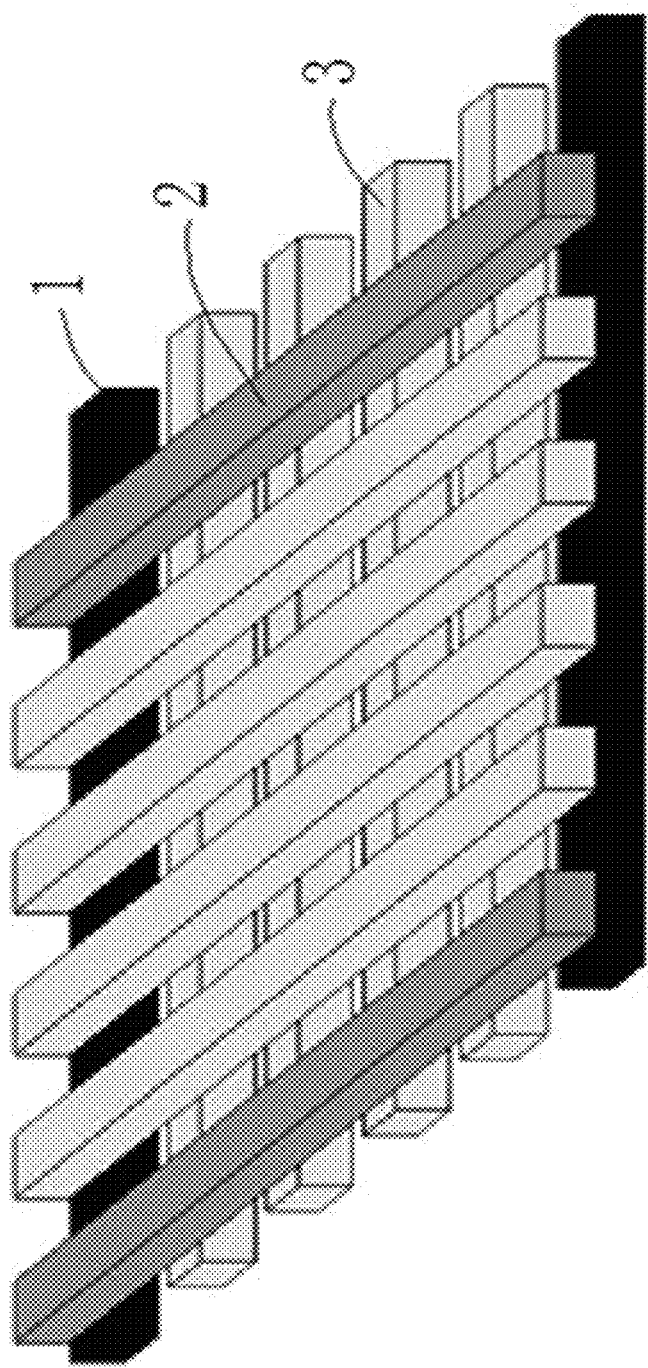
FIG. 3 is a stereoscopic structural schematic drawing of the matrix circuit of the present invention.

Referring to FIGS. 1, 2 and 3, a sensing circuit disclosed of the present invention, compared with the structure of an existing sensing circuit, has the following main improvements: 1, generally, a conducting material of the existing sensing circuit is coated or cladded to a circuit substrate, whereas in the present invention conductors are mixed to circuit substrates in a braiding manner; 2, conducting electrodes of the existing sensing circuit are straight, and thus are poor in tensile property, likely to rupture or damage, and short in life, however, electrodes of the present invention are bent and are at a compressed state, and thus have higher flexibility and tensile property than the prior art.

Figure 4A:
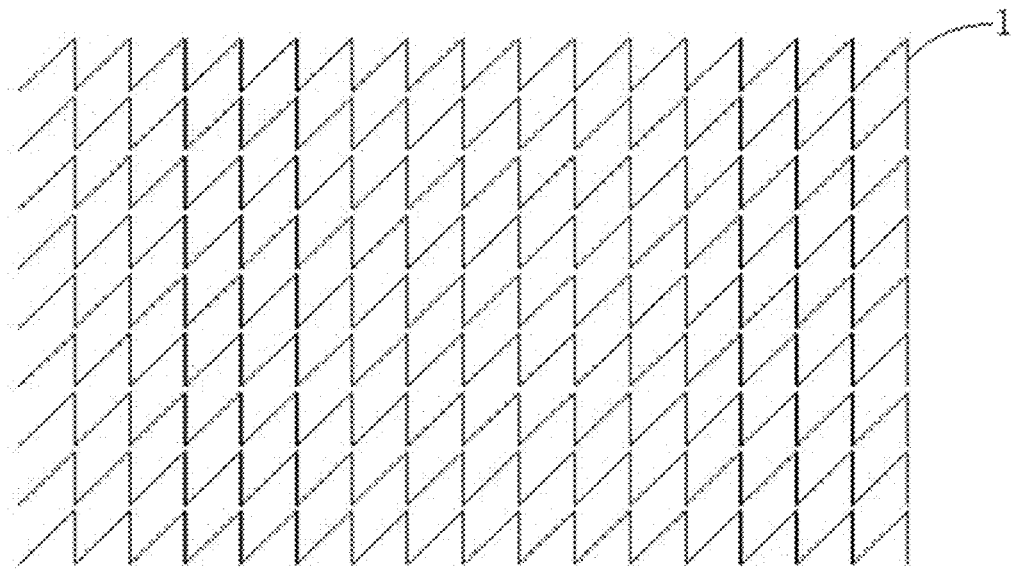
FIG. 4a is a structural schematic drawing of conductors in an X axis direction.

To be specific, as illustrated in FIG. 2 and FIG. 3, a sensing circuit disclosed by the embodiment of the present invention comprises a plurality of X electrodes and a plurality of Y electrodes that are distributed crosswise transversely and longitudinally, i.e., the X electrodes and the Y electrodes are of a sensing type distribution so as to form a plurality of grids. Each of the X electrodes and Y electrodes is composed of a plurality of flexible protection bodies and at least one conductor, for example, three flexible protection bodies and one conductor, wherein the conductors are uniformly arranged in the flexible protection bodies in a braiding manner. The conductors and the flexible protection bodies can be uniformly mixed together in a manner of braiding processing. For example, FIG. 4a refers to a plurality of conductors 1 in an X axis direction, FIG. 4b refers to a plurality of X electrodes, and as can be seen from the drawings, each of X electrodes is composed of a plurality of flexible protection bodies 3 and one conductor 1, and the conductors 1 are uniformly distributed in the flexible protection bodies 3 in a braiding manner. Correspondingly, FIG. 5a refers to a plurality of conductors 2 in a Y axis direction, FIG. 5b refers to a plurality of Y electrodes, and as can be seen from the drawings, each of Y electrodes is also composed of a plurality of flexible protection bodies 3 and one conductor 2, and the conductors 2 are uniformly distributed in the flexible protection bodies in a braiding manner. In specific implementations, each conductor may be made of a flexible tensile metal material, preferably a copper wire, which can be bent at any angle. Each flexible protection body may be made of a nonconducting fiber material or polymer material.

Figure 4B:
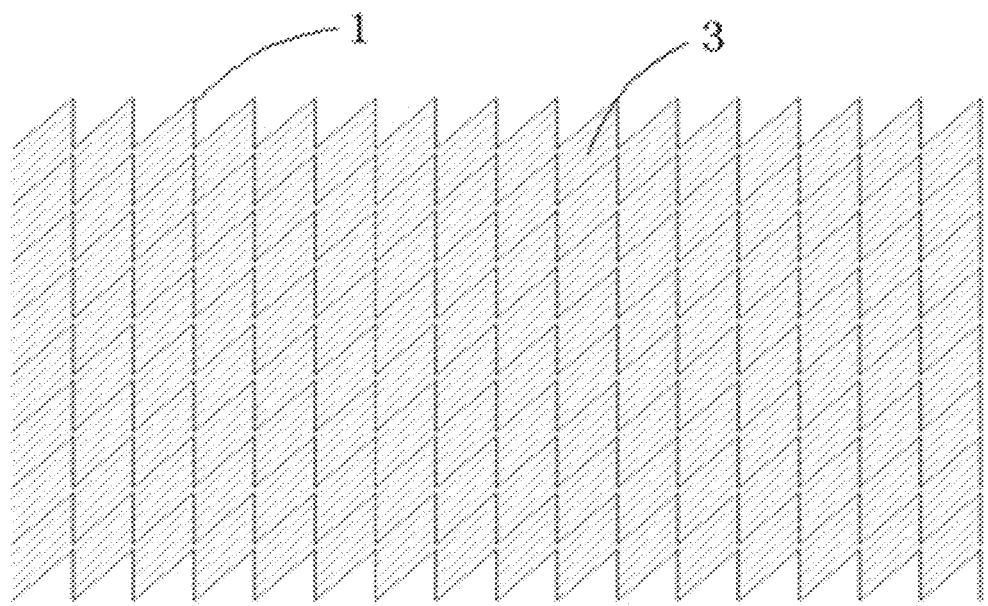
FIG. 4b is a structural schematic drawing of X electrodes of the present invention.
Figure 5A:
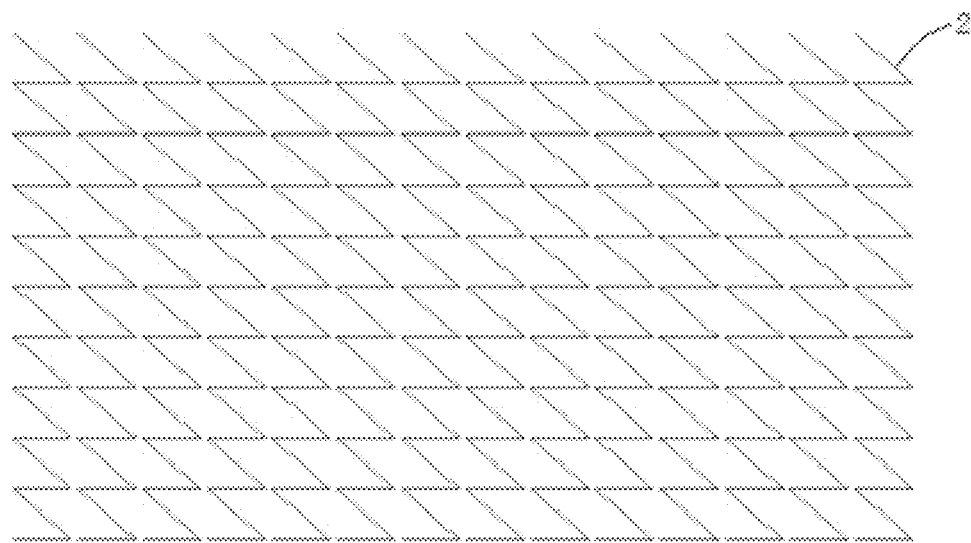
FIG. 5a is a structural schematic drawing of conductors in a Y axis direction.
Figure 5B:
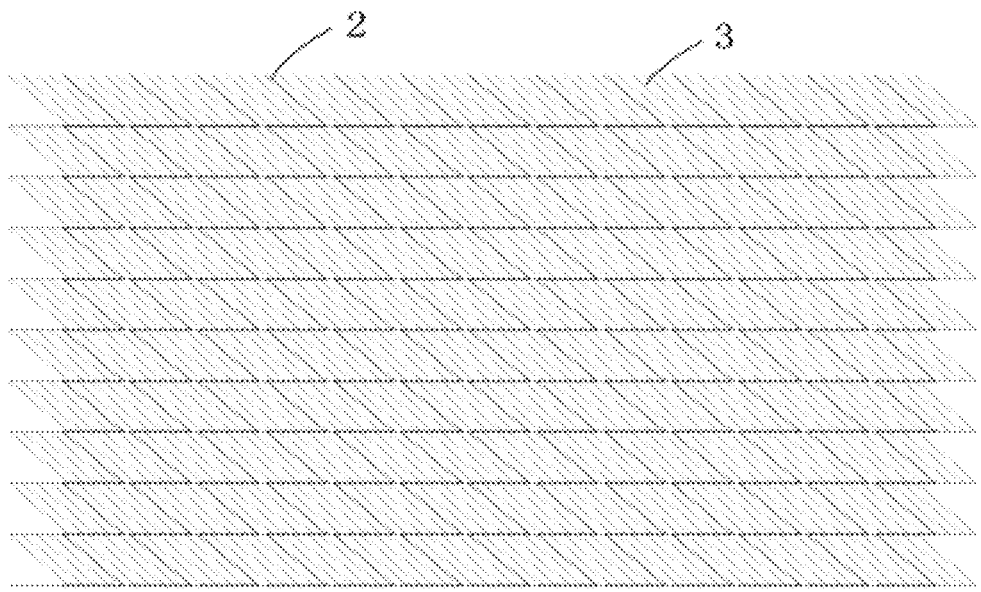
FIG. 5b is a structural schematic drawing of Y electrodes of the present invention.

In addition, the X electrodes and the Y electrodes are at a compressed state. As illustrated in FIGS. 2, 4b and 5b, each electrode is compressed to form a plurality of tooth shapes, however, each electrode of the existing sensing circuit is straight, and therefore the elastic and the tensile property of the electrodes of the present invention are enhanced. For example, a spring made of the same material has higher tensile property than a straight metal wire.

Figure 6A:
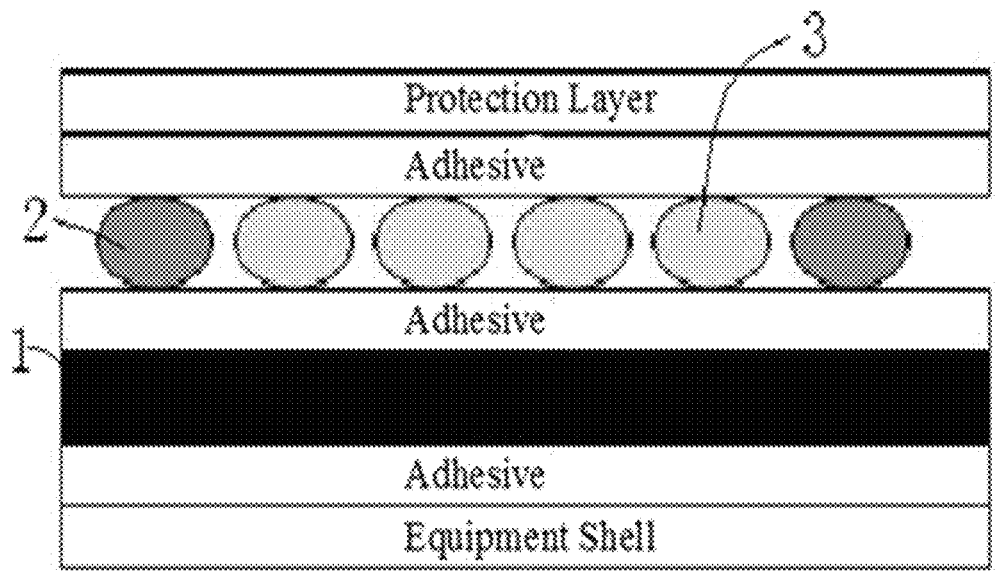
FIG. 6a and FIG. 6b are cross-sectional schematic drawings of the matrix circuit of the present invention in different angles.
Figure 6B:
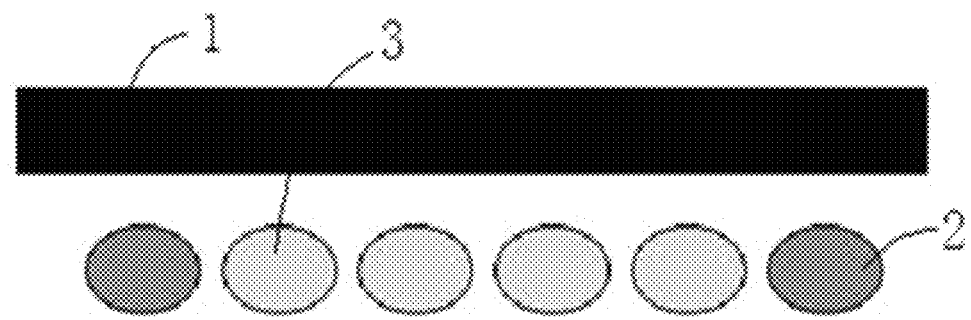

Further, as illustrated in FIGS. 6a and 6b, the sensing circuit of the present invention may further comprises circuit substrates (not shown) and a protection layer which are located on an upper end surface and a lower end surface of the sensing circuit respectively and can be adhered to a surface of the sensing circuit via an adhesive. The circuit substrates can be attached to related equipment which needs to sense an external contact, wherein a surface of the equipment may be a regular or irregular object surface, for examples, the equipment surface, such as a body surface of a robot, a body of a car or a body of an airplane. During implementation, each circuit substrate may be a transparent or non-transparent material, for example, an organic compound polymer film, artificial leather, a chemical fiber material, a cotton fabric or the like. The protection layer is used for protecting the surface of the sensing circuit, so as to avoid the surface of the circuit from being worn, scraped and the like as much as possible.

Therefore, compared with a sensing circuit of an existing capacitive screen, the sensing circuit of the present invention is flexibly inductive, and can be attached to the surface of an irregular object, and the sensing circuit can exist independently, without the need of a specific protection cover plate material. With respect to a resistance screen, a contact position of an object which deforms after contacting the sensing circuit does not need to be measured.

Figure 7:
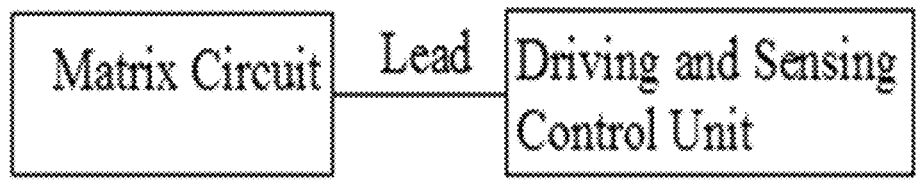
FIG. 7 is a structural schematic drawing of a sensing system of the present invention.

As illustrated in FIG. 7, the sensing circuit disclosed by the present invention further comprises a driving and sensing control unit. Upon calculation processing of the driving and sensing control unit, slight touch, collision of a large displacement or damage to a sensing circuit can be reported to a system end (i.e., the related equipment).

To be specific, the sensing circuit is connected with the driving and sensing control unit via a lead, i.e., each electrode on the sensing circuit is connected with the driving and sensing control unit via a lead. The sensing circuit is mainly used for sensing an object's contact, and transmitting an electric field change signal generated by the contact to the driving and sensing control unit.

Figure 8:
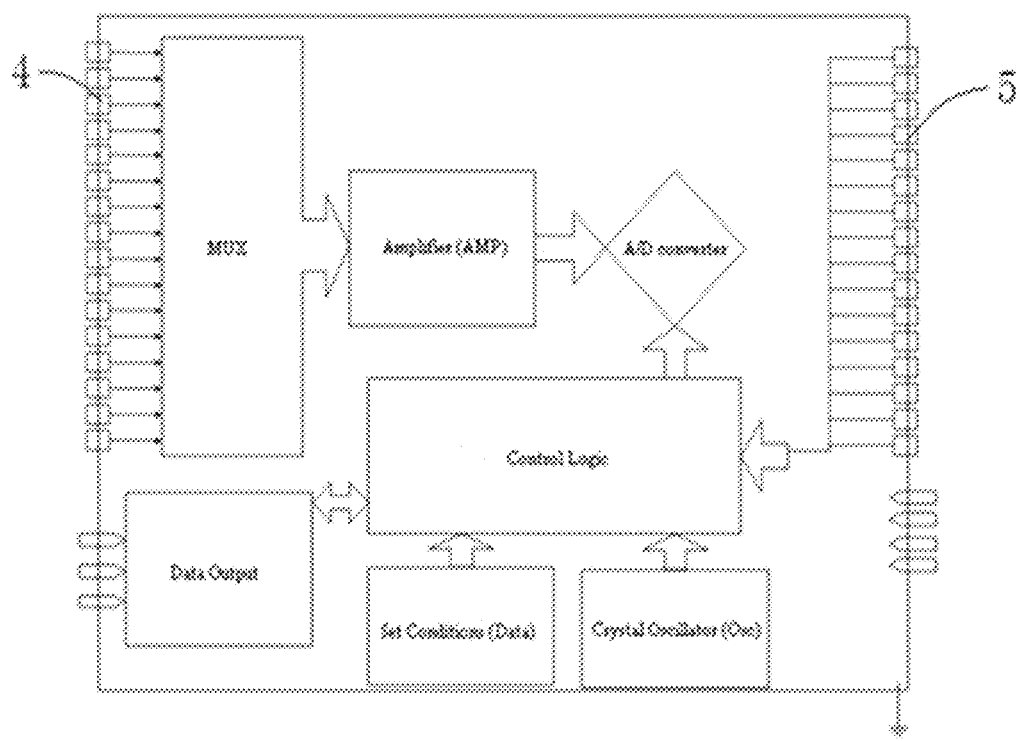
FIG. 8 is a structural schematic drawing of a driving and sensing control unit of the present invention.

The driving and sensing control unit is mainly used for scanning the detected electric field change signal on the sensing circuit, storing the features of a contact signal, and meanwhile processing and calculating the electric field change signal to obtain a contact position of the object on the sensing circuit and the features of the electric field change signal generated thereby. The driving and sensing control unit is also used for periodically transmitting driving signals to the sensing circuit, except for processing the electric field change signal of the sensing circuit. To be specific, as illustrated in FIG. 8, the driving and sensing control unit mainly comprises a signal scanning end, a control logic, a data output end and a driving circuit, wherein the signal scanning end is used for scanning signals on the sensing circuit periodically; the control logic is used for performing anti-interference processing, filtration and original signal comparison to pulse signals received from the signal scanning end to obtain a comparison result; the data output end is used for outputting the comparison result obtained from the control logic portion; the driving circuit is used for transmitting a driving signal to channels of the sensing circuit.

By means of the driving signal sent from the driving and sensing control unit, an original electric field signal can be formed on the surface of the sensing circuit. The electric signal is relatively balanced and is capable of changing regularly. When an external object contacts the surface of the sensing circuit, if the external object is a conductor, the electric field balance at the corresponding position of the sensing circuit can be damaged, and the driving and sensing control unit detects an electric field change position on the sensing circuit by scanning X electrodes and Y electrodes, i.e., the contact position of the object on the sensing circuit can be detected, and then the detected contact position signal can be input to the related equipment.

Figure 9:
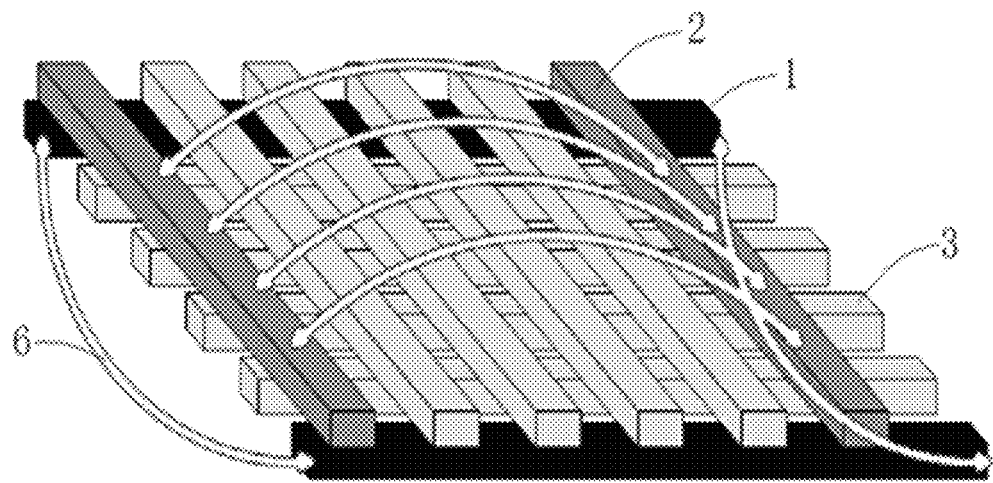
FIG. 9 is a structural schematic drawing when the surface of the matrix circuit contacts an object, but does not deform.
Figure 10:
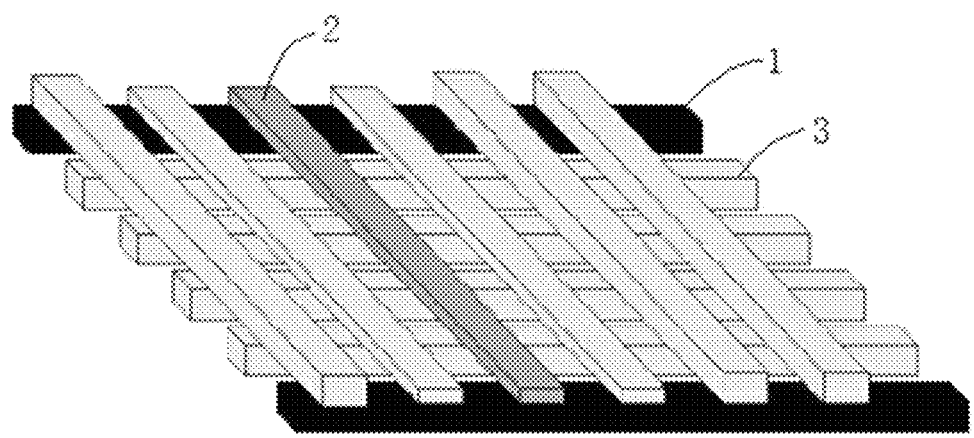
FIG. 10 is a structural schematic drawing when the surface of the matrix circuit contacts an object, but deforms.

To be specific, when the object is a conductor, there are two following cases: namely a slight contact without deformation, as illustrated in FIG. 9, under this case, a sensing system of the present invention is equivalent to a capacitive touch screen, and the conductor's contact can damage the electric field balance on the sensing circuit, and the driving and sensing control unit calculates a contact position of the object on the sensing circuit by tracking an electric field change signal of a touch point on the sensing circuit; and a contact having deformation, i.e., the object deeply contacts the related equipment to cause a physical deformation to the surface of an equipment shell covered by the sensing circuit, and as illustrated in FIG. 10, under this case, the driving and sensing control unit judges a size of deformation according to an electric field change value between every two adjacent channels on the sensing circuit to obtain an electric field change position, i.e., a contact position of the object on the sensing circuit.

If the object is a non-conductor, only one case, namely the occurrence of deformation can be detected. As illustrated in FIG. 10, to be specific, when the object contacts the surface of the sensing circuit, with respect to a slight deformation, the driving and sensing control unit calculates environment common-mode signal variables and finds that part of signal changes are not uniform, and therefore the occurrence of contact can be judged, and further the contact position and deformation size signals are transmitted to be related equipment.

However, accidental cases happen to the above contacts, for example, the deformation caused by the object's contact exceeds a self limitation of a sensing conducting material, thereby causing rupture of the conducting material and breaking of a sensing circuit. As such, when the driving and sensing control unit fails to drive the sensing circuit and an electric field environment at a corresponding position on the sensing circuit has a large difference from an original electric field environment, it can be judged that the conducting material at a corresponding position of the sensing circuit or the related equipment to which the sensing circuit is attached is damaged.

Figure 11:
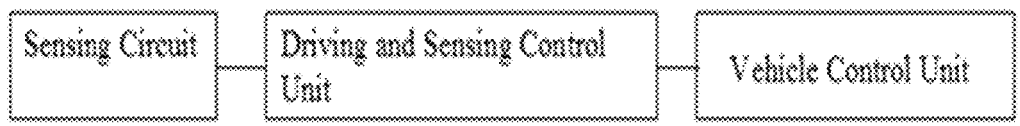
FIG. 11 is a structural schematic drawing of a vehicle body sensing system of the present invention.

The sensing circuit disclosed by the present invention is applied to a vehicle component to form a vehicle body sensing system. As illustrated in FIG. 11, a vehicle body sensing system disclosed by the present invention comprises a sensing circuit, a driving and sensing control unit and a vehicle control unit, wherein the sensing circuit is seamlessly attached to a vehicle body and is used for sensing a touch signal on the vehicle body, converting the touch signal into an electric field change signal and transmitting the electric field change signal to the driving and sensing control unit. The sensing circuit can be attached to a plurality of positions on the vehicle body, such as outer surfaces of vehicle facilities, for example, a door, a bumper, a fender, a chassis protection casing, a window or an engine cover. The specific structure of the sensing circuit may refer to the above description.

Preferably, after the sensing circuit is attached to the vehicle body, the surface of the sensing circuit may also be coated with a layer of protection material, for example paint, such that the smoothness and flatness levels of the surface of the sensing circuit can be ensured, and more importantly, the sensing circuit can be protected to a certain degree to prevent the sensing circuit from being scrapped easily.

The driving and sensing control unit is in wired connection with the sensing circuit via a lead, and used for driving the sensing circuit and judging whether or not a vehicle is touched by an object according to the sensed electric field change signal, obtaining a touched position of the object on the sensing circuit and outputting information on the touched position of the object and the sensing circuit to the vehicle control unit to be processed. To be specific, the driving and sensing control unit can refer to be the above description, and as illustrated in FIG. 8, will not be repeated again.

The vehicle control unit is connected with the driving and sensing control unit and used for informing an owner of loss situations caused by touch according to the information on the touched position and making corresponding measures according to the loss situations. To be specific, the vehicle control unit performs a judgment by integrating with conditions of a vehicle body according to an area of damage caused by collision and a numerical value of a vehicle speed sensor; if the touched position has no deformation and the driving and sensing control unit judges that an electric field signal on the sensing circuit can be restored to an initial state by comparing the electric field change signal sensed by the sensing circuit with an original electric field signal of the sensing circuit, it is illustrated to a certain degree that the caused collision is not heavy enough to threaten the safety of a driver and passengers, and there is only a need of making a corresponding prompt to inform an owner of loss situations (including a collision position, a collision area and the like) of the vehicle; if the driving and sensing control unit senses that an electric field signal on the sensing circuit cannot be restored to an initial state, a large difference happens, and it can be judged that the sensing circuit and the object to which the sensing circuit is attached deform or are damaged, and at this moment, the vehicle control unit judges that such collision threatens the safety of the driver and passengers by integrating with other situations, and then safety equipment, such as a supplementary restraint system or a safety air curtain is controlled to be opened to protect the driver and the passengers.

Figure 12:
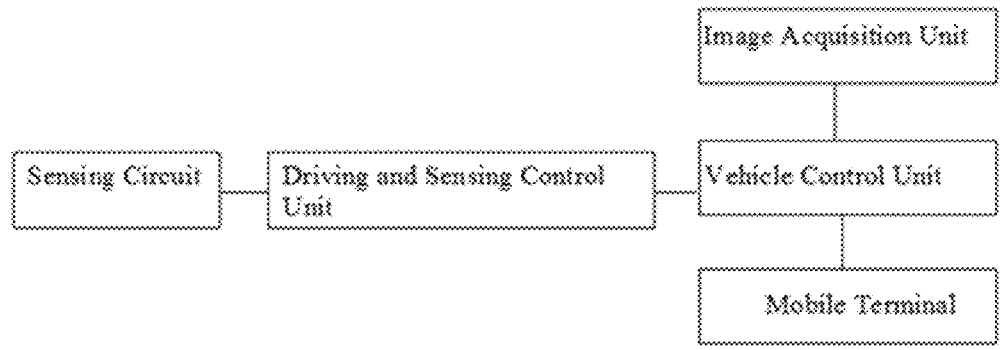
FIG. 12 is a structural schematic drawing of another embodiment of a vehicle body sensing system of the present invention.

As illustrated in FIG. 12, the vehicle body sensing system of the present invention further comprises an image acquisition unit inside a vehicle and a mobile terminal. The image acquisition unit and the mobile terminal are respectively connected with the driving and sensing control unit, wherein the image acquisition unit may be a camera lens, and the mobile terminal may be some APP software. To be specific, when the vehicle is at a stopping state, and the sensing circuit on the surface of the vehicle undergoes a large-area collision, under this case, the driving and sensing control unit obtains this collision signal by scanning, awakes a camera lens inside the vehicle immediately to capture an image when the collision happens, sends a short message to the owner via the APP software to remind the owner that the vehicle is at an unsafe state, and meanwhile transmitting the touched position of the vehicle and the pictures captured by the camera inside the vehicle to the owner. As such, after the owner leaves away from the vehicle, the loss situations of the vehicle can be mastered conveniently in time, a suspected vehicle can be locked fast by combining with the images captured as evidences, and therefore the safety performance of the vehicle in use is improved, and the loss is reduced.

Figure 13:
FIG. 13 is a functional block diagram where a key signal is processed by the vehicle body sensing system of the present invention.

In addition, the sensing circuit is further configured to receive an electric field signal transmitted by object's touch, and sending the electric field signal to the vehicle control unit; the vehicle control unit judges whether or not the electric field signal is a preset matching signal, thereby controlling related equipment to make a corresponding opening action. To be specific, in near field communication, as illustrated in FIG. 13, with respect to such specific encoding signal sent by a remote key, a signal from the remote key is likely to be interfered in the prior art, thereby causing that related equipment, such as a vehicle cannot be locked normally. According to the present invention, the signal from the remote key can be coupled to a human body as a conductor, and is transmitted to a sensing circuit on a vehicle door through the contact between the human body and the vehicle body, the driving and sensing control unit sends the touch signal to the control unit, and the vehicle control unit receives the touch signal and then judges whether or not the touch signal is a preset signal, for example, a preset key frequency signal, and if so, controls the vehicle door or a trunk to be opened. According to the present invention, the key signal is transmitted by contact, which cannot be not transmitted to outside, and thus cannot be read, and therefore the privacy safety of signal transmission is increased. And, the key signal can be generated by modulation with a mobile phone, and the output frequency and the signal content can be set and can be output by a headset jack.

Further, when the sensing circuit is attached to a steering wheel of the vehicle, in a vehicle driving process, in case that a remote control signal carrying about by a driver cannot be communicated to the vehicle control unit via the steering wheel, the vehicle control unit judges that two hands of the driver leave away from the steering wheel at this moment, and under this case, controls an engine to decelerate correspondingly and tries to remind the driver to return to a control position. When the sensing circuit is attached to a vehicle window, the driving and sensing control unit also sends a touch signal to the vehicle control unit, and the vehicle control unit receives the touch signal and performs a judgment and makes corresponding protection measures. But it needs to be illustrated that, when the sensing circuit is attached to the vehicle window, the whole sensing circuit is transparent, i.e., the flexible substrates and the conductors are transparent.

According to a processing method of a sensing circuit disclosed by the present invention, a flexible electric sensing circuit having a tensile property is formed by taking a flexible braided fabric as a substrate of the electric field sensing circuit by adopting a manner of penetrating, blending and braiding, or jet printing.

Embodiment 1

As illustrated in FIG. 14, a processing method of a sensing circuit disclosed by the present invention comprises the following steps:

Step 1, laying a substrate to be flat, wherein a conducting material penetrates through the substrate and is arranged by penetrating through two surfaces of the substrate so as to form a sensing circuit on two surfaces of the substrate.

As illustrated in FIG. 14a, the conducting material is divided into a plurality of straight portions 8a and raised portions 8b which are distributed at intervals, wherein the straight portions 8a are attached to one surface of the substrate 7. On the bottom surface as illustrated in FIG. 14a, the raised portions 8b are raised to the top surface of the substrate from the bottom surface of the substrate, and the raised portions 8b penetrates out from the top surface of the substrate.

As illustrated in FIG. 14b further, the conducting material 8 is at a compressed state integrally. The conducting material 8 penetrates out from the top surface of the substrate 7 toward a bottom surface direction thereof or penetrates out from the bottom surface toward a top surface direction, according to a left-to-right direction as illustrated in FIG. 14b, and as such, a sensing circuit according to a designated electric field arrangement is formed on two surfaces of the substrate 7.

Preferably, the substrate and the conducting material can refer to the above description. The conducting material can be guided by a guide and penetrates through the substrate. The guide may be some sharp objects, such as a metal needle, and the guide can penetrate through the substrate.

Step 2, after the sensing circuit is laid, performing insulation and flatness treatment to two surfaces of the substrate, namely performing insulation treatment on the sensing circuit.

The sensing circuit is subject to insulation treatment for isolating conducting substances. In implementation, a layer of insulation layer is adhered to the front and back surfaces of the substrate via an adhesive, wherein the insulation layer may be made of a plastic insulation material, a tempered glass insulation material and the like, or is directly coated with a layer of insulation glue.

Step 3, guiding the electric field circuit out from the edge of the circuit substrate via a lead.

The lead is used for signal input/output. By means of the lead, the sensing circuit can be connected with other circuits, such as a driving and sensing control unit, to realize signal processing and control to the sensing circuit. Preferably, a frame leading-out line at the edge of the substrate employs a conducting zipper as a signal in-out way of the electric field sensing circuit, thereby being convenient and rapid.

Step 4, adhering an insulation material to the sensing circuit.

The insulation material is used for protecting and avoiding the sensing circuit from directly contacting an external conductor. In this embodiment, the surface of the sensing circuit is sprayed or infiltrated with colloid first, and the insulation material is attached to the surface of the sensing circuit via the colloid.

Embodiment 2

As illustrated in FIG. 15, a processing method of a sensing circuit disclosed by the present invention comprises the following steps:

Step 1, distributing a conducting material and the substrates at intervals according to a certain proportion, and mixing the conducting material and the substrates together to form the sensing circuit according to the arrangement of the electric field circuit and by adopting a braiding manner.

In this embodiment, for example, three substrates and one conducting material are distributed at intervals, and the conducting material is uniformly distributed in the substrates by adopting a braiding manner. The substrates and the conducting material can refer to the above description.

Step 2, guiding the electric field circuit out from the edge of the sensing circuit via a lead after the sensing circuit is braided.

The lead is used for signal input/output. By means of the lead, the sensing circuit can be connected with other circuits, such as a driving and sensing control unit, to realize signal processing and control to the sensing circuit. Preferably, a frame leading-out line at the edge of the substrate employs a conducting zipper serving as a signal in-out way of the electric field sensing circuit, thereby being convenient and rapid.

Step 3, adhering an insulation material to the sensing circuit.

The insulation material is used for protecting and avoiding the sensing circuit from directly contacting an external conductor. In this embodiment, the surface of the sensing circuit is sprayed or infiltrated with colloid first, and the insulation material is attached to the surface of the sensing circuit via the colloid.

The sensing circuit as illustrated in FIG. 2, that can be formed by a processing technology of the embodiment 2 comprises a plurality of X electrodes and a plurality of Y electrodes that are distributed crosswise transversely and longitudinally, i.e., the X electrodes and the Y electrodes are of a sensing type distribution so as to form a plurality of grids. Each of the X electrodes and Y electrodes is composed of a plurality of substrates and at least one conducting material, for example three substrates and one conducting material.

In addition, the X electrodes and Y electrodes are at a compressed state, and each electrode is compressed to form a plurality of tooth shapes. Each electrode of the existing sensing circuit is linear, and therefore the elasticity and the tensile property of the sensing circuit of the present invention are enhanced.

Embodiment 3

As illustrated in FIG. 16, in Step 1, the substrate is laid to be flat, and a position, where the corresponding electric field circuit is arranged, on the surface of the substrate is sprayed with conducting particles to form the sensing circuit.

In this embodiment, the conducting material is uniformly distributed on the surface of the substrate by adopting a spraying manner, and the corresponding electric field circuit is formed on the surface of the substrate. The substrate and the conducting material can refer to the above description.

In Step 2, the electric field circuit is guided out from the edge of the sensing circuit via a lead after the sensing circuit is sprayed.

The lead is used for signal input/output. By means of the lead, the sensing circuit can be connected with other circuits, such as a driving and sensing control unit, to realize signal processing and control to the sensing circuit. Preferably, a frame leading-out line at the edge of the substrate employs a conducting zipper as a signal in-out way of the electric field sensing circuit, thereby being convenient and rapid.

In Step 3, an insulation material is adhered to the sensing circuit.

The insulation material is used for protecting and avoiding the sensing circuit from directly contacting an external conductor. In this embodiment, the surface of the sensing circuit is sprayed or infiltrated with colloid first, and the insulation material is attached to the surface of the sensing circuit via the colloid.

According to a curved surface profile measuring method disclosed by the present invention, circuit channels on the circuit are driven in sequence on the basis of a flexible sensing circuit, position data of the circuit channels are obtained by an electric field induction manner, and a curved surface shape is restored really according to these data.

The principle of curved surface profile measurement in the present invention will be described as below, for example, measuring an arched irregular curved surface. Of course, the present invention is not limited to measure an arched curved surface, and other curved surfaces of irregular shapes are also applicable in the present invention.

As illustrated in FIG. 17, a curved surface profile measuring method disclosed by the present invention comprises the following steps:

Step 1, attaching the sensing circuit to a curved surface to be measured, and restoring position data of each of electric field channels by sensing a distance value between every two adjacent electric field channels on the sensing circuit.

The sensing circuit in this embodiment comprises a flexible substrate and a plurality of electric field channels distributed in the flexible substrate, and the electric field channels in the substrate are uniformly arranged, equidistantly spaced, uniform in material and identical in size, wherein each electric field channel is composed of a plurality of flexible protection bodies and at least one conductor; the conductors are uniformly arranged in the flexible protection bodies in a braiding manner, and preferably, each electric field channel in this embodiment is at a compressed state. Therefore, the sensing circuit in this embodiment is flexible and tensile integrally and can be attached to a curved surface of an irregular shape.

To be specific, electric field channels (C1,C2 . . . Cn) on the circuit are driven in sequence before the sensing circuit is attached to the curved surface to be measured, distances D1, D2 . . . Dn−1 between every two adjacent channels (C12, C23 . . . Cn−1 Cn) are obtained in an electromagnetic induction manner, and at this moment the distances between every two adjacent electric field channels are equal, i.e., D1=D2 . . . =Dn−1=D, wherein, n is an integer greater than 2. Of course, in specific implementation, it is uncertain to define a distance between every two adjacent electric field channels here, and a distance between adjacent three electric field channels (i.e., channels C1 and C3, channels C4 and C6 . . . channels Cn−2 and Cn) or a distance between channels of other number can also be provided.

The flexible substrate of the sensing circuit is seamlessly attached to the surface of an arched object. The shape of the arched object is as illustrated in FIG. 18, the electric field channels are kept to be parallel to an arched curved surface, and at this moment, the flexible substrate deforms merely, rather than stretching. Under this case, the distance values D1, D2 . . . Dn−1 between every two adjacent electric field channels are calculated in sequence according to coordinates of the starting electric field channel and in conjunction with a capacitance-based distance measuring principle. Then position data of each electric field channel is restored according to these distance values. To be specific, a calculation formula adopted by the capacitance-based distance measuring principle is as follows: $C=\varepsilon S/d$, wherein C represents a capacitance of the electric field channel, $\varepsilon$ is a dielectric constant, S is an electric field area formed between every two adjacent electric field channels, and d is a distance between every two adjacent electric field channels. That is, a distance D12 between the channel C1 and the channel C2 can be obtained according to coordinates (X1, Y1) of the electric field channel C1, coordinates of the electric field channel C2 can be obtained according to this distance value D12, and as such, the position data of all the electric field channels can be obtained finally. When the electric field channels C1, C2 . . . Cn are located on the same plane, the surface of an object to be measured is flat, i.e., the coordinates of C2 are (X1+D, Y1), the coordinates of C3 are (X1+2 D, Y1), and the length of the surface of the object to be measured is N*D. The channels C1C3 are subject to electric field sensing independently to obtain a distance D13 which is a distance 2 D.

Figure 19:
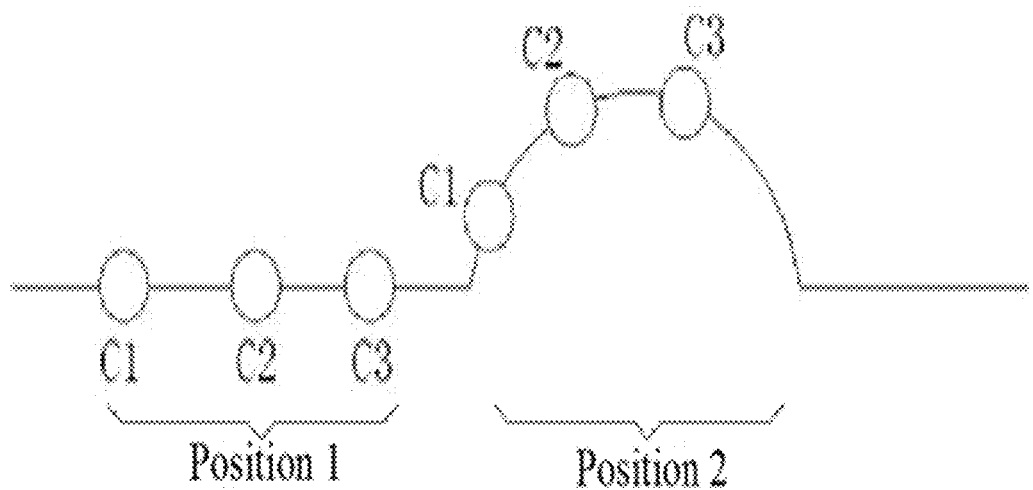
FIG. 19 is a principle schematic drawing of the electric field circuit of the present invention on the arched object of an embodiment of the present invention.

In addition, the situation of the surface of the object where the electric field channels can be judged according to a distance value between every two electric field channels. With the electric field channels C1, C2 and C3 in FIG. 19 as examples, when the three channels are arranged at Position 1 on the surface of the object, D1=D2=D, and it is illustrated that the electric field channels C1, C2 and C3 are located on the same plane, and the surface of the object to be measured is flat; when the three channels are located at Position 2 on the surface of the object, D1<D, D2<D, and it is illustrated that the channels C1 to C2 and the channels C2 to C3 are bent.

Step 2, acquiring position data of a plurality of groups of electric field channels by changing a driving position of the sensing circuit at least once in a direction perpendicular to a surface of the curved surface to be measured;

In view of finite data acquired in Step 1, it cannot approach to actual appearance data of the object to be measured infinitely, and therefore enough data can be acquired in a manner of changing a driving position of the sensing circuit at least once in a direction perpendicular to the surface of the curved surface to be measured. The position data of the corresponding electric field channel on the circuit can change in every change of a driving position of the sensing circuit, and at this moment, it is also necessary to calculate a distance between every two adjacent electric field channels according to the coordinates of the starting electric field channel and in conjunction with a capacitance-based distance measuring principle, and then restore the distance value to obtain the position data of each electric field channel. The specific calculation process will not be repeated here, which may refer to the specific description in Step 1.

Step 3, judging a position state of each electric field channel according to the position data of the plurality of groups of electric field channels, and restoring a shape of the curved surface to be measured.

To be specific, the position data of a plurality of groups of electric field channels can be obtained by changing the positions of the electric field channels in the sensing circuit for multiple times, a radian change law of the curved surface to be measured can be described according to these data and in a form of a function y=f(x), and a trajectory of the function is restored by Fourier transform to obtain a real appearance of the arched surface to be measured.

Figure 20:
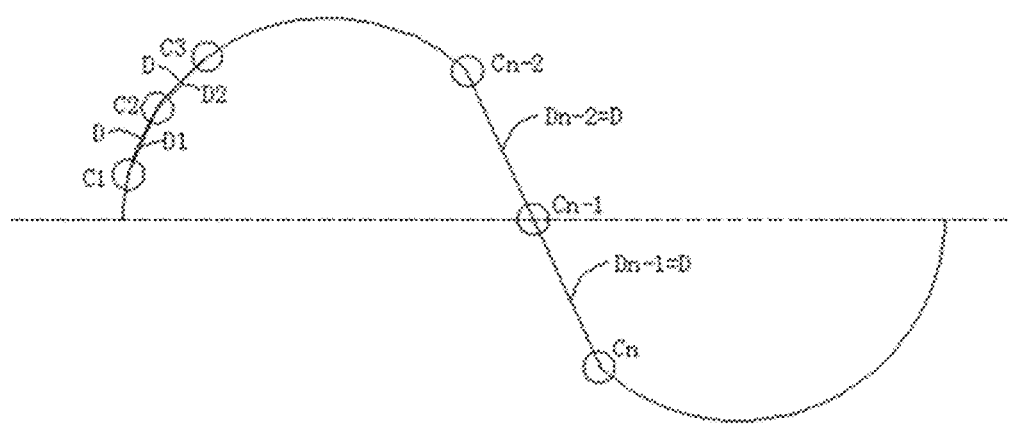
FIG. 20 is a principle schematic drawing of judging whether or not all the electric field channels are located on the same plane.

Further, the position data of each electric field channel, for example whether or not the electric field channels are located on the same plane, can also be judged by changing a driving position of the sensing circuit for multiple times. There are two possibilities in relative positions of the electric field channels C1, C2 and Cn generally, namely ascending longitudinally (which can be interpreted as a Y axis direction), and descending longitudinally.

to be specific, the conditions of judging whether or not all of the electric field channels are located on the same plane are as follows: if $\Delta d1=\Delta d2=0$, judging that every three adjacent electric field channels are located on the same plane; if $\Delta d1 \neq 0$ and/or $\Delta d2 \neq 0$, judging that every three adjacent electric field channels are not located on the same plane, wherein $\Delta d4=D1-D$, $\Delta d2=D2-D$, $\Delta d1$ and $\Delta d2$ are distance change values between every two adjacent channels of the three adjacent channels, D1 and D2 represent a linear distance between every two adjacent electric field channels, and D represents a substrate distance between every two adjacent electric field channels. As illustrated in FIG. 20, with respect to the channels C1, C2 and C3, $\Delta d1=D1-D<0$ and $\Delta d2=D2-D<0$, it is judged that the channels C1, C2 and C3 are not located on the same plane; with respect to channels Cn-2, Cn-1 and Cn, if $\Delta dn-2=Dn-2-D=0$, $\Delta dn-1=Dn-1-D=0$, it is judged that the channels Cn-2, Cn-1 and Cn are located on the same plane.

Figure 21:
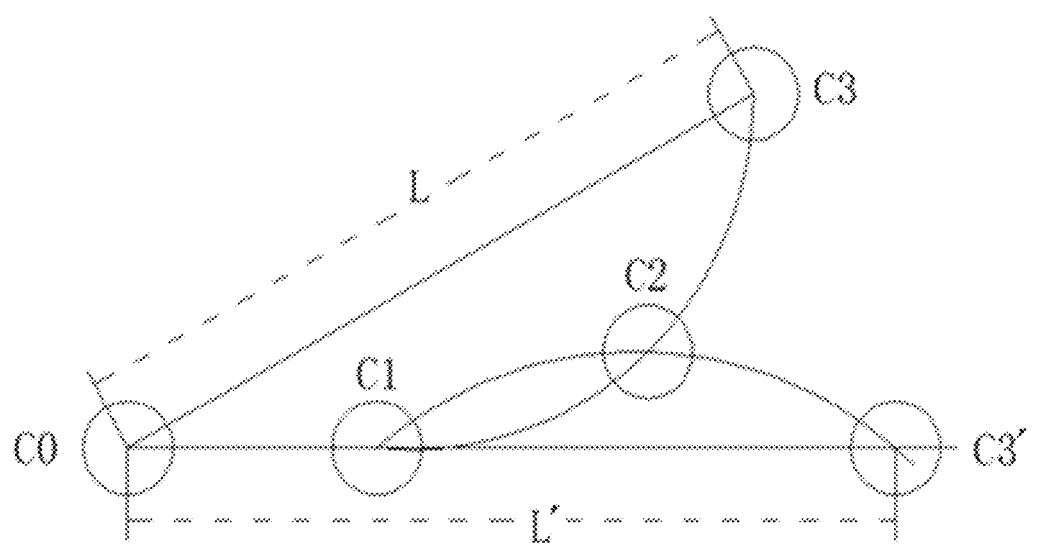
FIG. 21 is a principle schematic drawing of judging an arrangement trend direction of electric field channels of the present invention.

Further, an arrangement trend direction of the electric field channels, for example, which is upward or downward in a Y axis direction, can also be judged according to a linear distance between every two of a plurality of electric field channels by changing the positions of the electric field channels in the sensing circuit. To be specific, as illustrated in FIG. 21, with four adjacent electric field channels C0, C1, C2 and C3 in FIG. 21 as examples, if a trend direction of the channels C2 to C3 needs to be judged, it is assumed that there is an upward trend from the channel C2 to the channel C3 by taking the starting channel C0 as a judgment basis, and then the linear distance from the channel C3 to the channel C0 is measured as L; if it is assumed that there is a downward trend from the channel C2 to the channel C3, a linear distance from the channel C3' to the channel C0 is measured as L'. Because the distance L' is certainly larger than the distance value L, the trend direction from the channel C2 to the channel C3 is judged according to the measured linear distance: if the measured linear distance is larger, there is a downward trend from the channel C2 to the channel C3; on the contrary, there is an upward trend from the channel C2 to the channel C3.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A curved surface profile measuring method, comprising:
   attaching a sensing circuit to a curved surface to be measured, and restoring position data of each of electric field channels by sensing a distance value between every two adjacent electric field channels on the sensing circuit;
   changing a driving position of the sensing circuit at least once in a direction perpendicular to a surface of the curved surface to be measured, and acquiring position data of a plurality of groups of electric field channels; and
   judging a position state of each electric field channel according to the position data of the plurality of groups of electric field channels, and restoring a shape of the curved surface to be measured.

2. The measuring method according to claim 1, wherein a radian change law of the curved surface to be measured is described in a form of a function $y=f(x)$ according to the obtained position data of the plurality of groups of electric field channels, and a trajectory of the function is restored through Fourier transform, that is, the shape of the curved surface to be measured can be restored.

3. The measuring method according to claim 1, wherein position data of one group of electric field channels is obtained in every change of a position where the electric field channels are located in the matrix circuit are driven once, and the position data of each group of electric field channels is also restored by detecting a distance value between every two adjacent electric field channels on the matrix circuit.

4. The measuring method according to claim 1, wherein a calculation process of the distance value between every two adjacent electric field channels on the sensing circuit comprises:
   calculating a distance value between every two electric field channels in sequence according to coordinates of a starting electric field channel and in conjunction with a capacitance-based distance measuring principle; a calculation formula adopted in the capacitance-based distance measuring principle is as follows: $C=\varepsilon S/d$, wherein C represents a capacitance of the electric field channel, $\varepsilon$ is a dielectric constant, S is an electric field area formed between every two adjacent electric field channels, and d is a distance between every two adjacent electric field channels.

5. The measuring method according to claim 1, wherein,
   judging the position state of each electric field channel comprises: judging whether or not all of the electric field channels are located on the same plane; if $\Delta d1=\Delta d2=0$, judging that every three adjacent electric field channels are located on the same plane; if $\Delta d1 \neq 0$ and/or $\Delta d2 \neq 0$, judging that every three adjacent electric field channels are not located on the same plane, wherein $\Delta d1=D1-D$, $\Delta d2=D2-D$, $\Delta d1$ and $\Delta d2$ are distance change values between every two adjacent channels of the three adjacent channels, D1 and D2 represent a linear distance between every two adjacent electric field channels, and D represents a substrate distance between every two adjacent electric field channels; and
   judging the position state of each electric field channel further comprises: judging an arrangement trend direction of the electric field channels according to a linear distance between every two of the plurality of electric field channels.

* * * * *